Nov. 15, 1955  J. M. MILLER ET AL  2,723,756
APPARATUS WITH BONDED ADSORBENT BLOCK AND CAPILLARY
CHROMATOGRAPHIC ADSORPTION THEREWITH
Filed April 24, 1951

INVENTORS:
J. M. MILLER &
J. G. KIRCHNER

BY L. M. Mantell
ATTORNEY

United States Patent Office 2,723,756
Patented Nov. 15, 1955

2,723,756

APPARATUS WITH BONDED ADSORBENT BLOCK AND CAPILLARY CHROMATOGRAPHIC ADSORPTION THEREWITH

John M. Miller, Pasadena, and Justus G. Kirchner, La Canada, Calif., assignors to the United States of America as represented by the Secretary of Agriculture Application April 24, 1951, Serial No. 222,724

6 Claims. (Cl. 210—42.5)

(Granted under Title 35, U. S. Code (1952), sec. 266)

The invention herein described may be manufactured and used by or for the Government of the United States of America for governmental purposes throughout the world without the payment to us of any royalty thereon.

This invention relates to the art of chromatography and in particular the objects of this invention are to provide a novel device useful in chromatography and methods for applying this device in the isolation and/or identification of compounds. Briefly described, our invention envisions a chromatographic column which is rigid, self-supporting and self-contained whereby it exhibits many advantages over the usual columns of loose material which must be supported between the walls of a glass cylinder. Further objects and advantages will be apparent from the description herein.

The technique of chromatography is a relatively new technique used in many laboratories for the analysis, identification, or isolation of compounds which are not susceptible of resolution by other techniques. In general, chromatography involves initially packing particles of a solid adsorbent material, such as silica or alumina, in a tall glass column. A solution of the material to be analyzed is then carefully poured on top of the adsorbent mass. Then in order to separate the several components of the original mixture, various solvents are poured through the adsorbent; this procedure is known as "developing." The particular solvents to be used will depend on the character of the adsorbent used and the compounds involved. When the proper solvents are used the component compounds are moved to varying distances along the length of the column where they form distinct zones or bands as they are usually called. In the resolution of plant pigments and other colored materials the position of these bands on the column can easily be seen by contrast with the white background of the adsorbent. However, when the component compounds are colorless, then it is necessary to treat the outer surface of the adsorbent column with a suitable indicator to cause development of specific color changes which will then serve to locate the various bands. With the usual columns of packed adsorbent particles, this step of applying the indicator is difficult to perform. The point is that the column must be removed intact from its glass envelope so that its surface can be sprayed with the indicator. In removing the column great pains must be taken to prevent the loose particles from falling apart. Further, if the glass container is not absolutely uniform in cross section it may be impossible to extrude the adsorbent column. For these and other reasons as set forth below the conventional packed columns are exceedingly cumbersome to use where an indicating solution must be applied.

We have now found that the disadvantages of the prior art may be avoided by forming a rigid, self-supporting, self-contained adsorbent column. Such a column is prepared very readily by first mixing, in the dry, the adsorbent with $CaSO_4 \cdot \frac{1}{2}H_2O$ (plaster of Paris). To this mixture is then added water to make a slurry which is just liquid enough to pour. This slurry is then poured into a suitable mold to form an elongated bar and is allowed to harden. The resulting bar has the same properties as a packed column of loose material with regard to adsorption and resolution and moreover has the important advantages that it is rigid, self-supporting and self-contained.

Thus, our rigid column will support itself and does not need a glass envelope.

By eliminating the glass envelope, the material in each band is more uniformly distributed. Thus we have removed successive small layers from the surfaces of developed rigid columns and observed each new surface by spraying with an indicator or observing in ultra-violet light. We have found that in each case the material was uniform throughout the cross section of each band. In the case of columns packed in glass cylinders, uniformity is never obtained because the solvent in these columns tends to travel more rapidly along the column-glass interface than through the column itself.

By elimination of the glass envelope the cumbersome task of extruding packed columns is completely obviated together with the attendant danger of breaking the column.

Further, our rigid column is particularly adapted for application of indicator solutions or sprays. Thus the rigid column can be easily lifted out of the apparatus where it is developed and the indicator applied to its surface. If the indicator does not have the desired effect, then it is a simple matter to scrape off the surface of the rigid column and apply a different indicator. With a packed column such successive application of indicators is impossible because the extruded packed column is too delicate to be scraped; if this were attempted the column would crumble. Moreover, by making our rigid column square or rectangular in cross-section it is possible to apply several different indicators to different sides of the column.

Our rigid column has the advantage that it can be developed by the ascending method. Thus the material is applied to the top of the rigid column, the column is then inverted into a vessel containing a solvent whereby the solvent is applied to the bottom of the column where the material deposit is now situated. The solvent then rises through the column by virtue of capillary attraction which automatically ensures uniformity of flow and establishes sharply defined, distinct bands of regular pattern.

Another advantage of our rigid column is that development can be interrupted to spray an indicator on the surface of the column. If the development has not progressed enough, the indicator reagent can be scraped off and the column returned to the original or a different developing treatment. Such manipulation is impossible with packed columns since if they are extruded to spray on an indicator it is impossible to return them to the glass envelope because of their fragile nature.

Another advantage of our rigid column is that it can be made fluorescent by addition of zinc cadmium sulphide and zinc silicate to the ingredients of the column. The resulting column can be observed under ultra-violet light without the necessity of removing the column from the solvent and without inference due to adsorption of ultra-violet light by glass as would be the case with a column packed in a glass envelope.

By casting a slurry of the adsorbent material, we quickly obtain uniform distribution of particles without the necessity of careful tamping as is the case with the prior columns packed in glass tubes.

The drawing accompanying this specification illustrates a rigid chromatographic column in accordance with this invention and also illustrates how it is applied in the chromatographic process. Thus:

Figure 1:
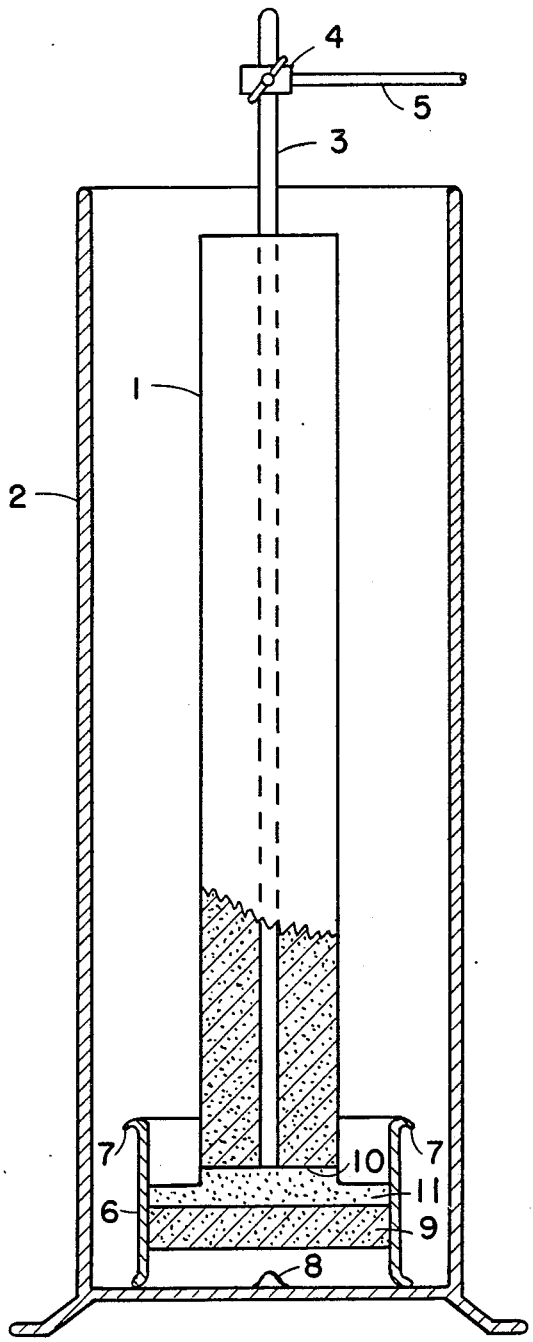
Fig. 1 is a view, partly in cross-section, of the rigid column including the glass rod embedded therein, and the apparatus for development. The column in this view is in position for such development.
Figure 2:
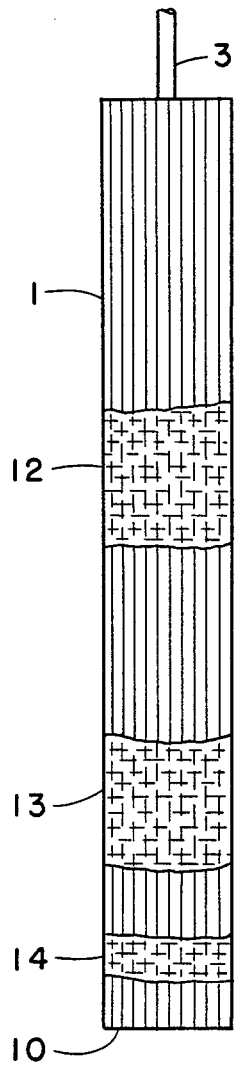
Fig. 2 is a view of the column after development and after application of the indicator to make the bands visible.

Referring now to these drawings, the structure and functions of the devices shown are explained as follows:

A small amount of a solution of the material to be chromatographed is applied to the lower end 10 of rigid chromatographic column 1. When applying this solution, the column is simply inverted from its position as shown in Figs. 1 and 2 and the solution applied uniformly to end 10 with a pipet or other suitable device. The column is then ready for development. To this end, the column is positioned in vessel 2. The upper end of glass rod 3 passes through screw-clamp 4 which attaches it to arm 5 which in turn is attached to a ring-stand or other suitable support. The lower end of column 1 is positioned within glass cylinder 6 which serves as a solvent distributor. This cylinder 6 is provided with several hooks as at 7 for convenience in removing it from the vessel, also provided are several ports as at 8 to allow solvent to flow from the vessel into the cylinder. About half of the cylinder 6 is filled with plug 9 made of a mixture of plaster of Paris and the same adsorbent as used in the column and dried as in the case of the column. This plug serves as a solid base to support column 1 and mass 11 and also serves to distribute solvent evenly to mass 11 and eventually to column 1. Plug 9 may be made of any solid, inert, porous material though we have found it convenient to cast a moist mixture of plaster and the adsorbent material right in the cylinder, then drying the complete unit. About the top of plug 9 and bottom of column 1 is a mass of a loose inert material 11 such as calcium sulphate which is tamped into place with a wooden rod. Instead of calcium sulphate, one may use silicic acid, magnesium oxide, calcium carbonate or any other finely powdered material which packs well and does not dissolve or react with the solvent. Mass 11 has the function of uniformly distributing the solvent from plug 9 to column 1.

After the column has been positioned as above described, the desired solvent is carefully poured down the inner walls of vessel 2 until it forms a pool not deeper than the top of cylinder 6. The device is then allowed to stand whereby the solvent enters ports 8 and diffuses upwardly through plug 9, mass 11 and up into column 1 by capillary attraction. In ascending the column the solvent causes separation of the materials applied to end 10 into distinct bands. After allowing enough time for the development the column is lifted out and if necessary, its surface is sprayed with suitable indicators. After the individual bands have become visible these sections of the column may be cut out with a saw to extract or otherwise isolate the individual materials.

In Fig. 2 is shown the rigid column to which was applied alpha-pinene, terpinyl acetate and alpha-terpineol. This column was developed with hexane-ethyl acetate and the bands made visible with fluorescein-bromine. The three compounds are visible as bands of yellow on a pink background. In this chromatograph, band 12 is alpha-pinene; band 13 is terpinyl acetate; and band 14 is alpha-terpineol.

The following examples demonstrate, merely by way of illustration but not limitation, how our rigid column may be prepared and applied in use.

*Example I*

*Preparation of the rigid column*

Seventy-two grams of finely ground silicic acid was thoroughly mixed with 18 grams of $CaSO_4 \cdot \frac{1}{2}H_2O$. This mixture was blended with 135 ml. of water and the slurry poured into a mold having a glass rod extending through the middle of the molding cavity and allowed to harden. The resulting rigid column was 10 inches long and 1 inch square in cross-section. It was dried in a forced draft oven at 75° C. for about 8 hours. The column was then kept in a vacuum desiccator until required for use. Immediately prior to using the bar was slightly rubbed with fine sandpaper to remove surface irregulatries and one end was trimmed so as to present a smooth, flat surface perpendicular to the side of the bar. This bar and others prepared by similar procedures were used in the examples.

*Example II*

A solution of 17 mg. of alpha-pinene, 10 mg. of alpha-terpineol, and 10 mg. of terpinyl acetate in 1 ml. of hexane was applied to one end of the bar as prepared in Example I. The bar was then developed with hexane containing 15% ethyl acetate in the manner described hereinabove. The developed bar was then sprayed with fluorescein and then exposed to bromine vapors. The three compounds then became visible as bands of yellow on a pink background as shown in Fig. 2. Thus band 12 is alpha-pinene, band 13 terpinyl acetate, and band 14 is alpha-terpineol.

*Example III*

A solution of 20 mg. of limonene, 20 mg. of alpha-terpineol and 20 mg. of terpinyl acetate in 1 ml. of hexane was applied to an end of a bar prepared as in Example I. The bar was developed with hexane until this solvent had traveled ⅔ of the column. The bar was then removed to a different developing vessel where it was further developed with 15% ethyl acetate in hexane. The developed bar was sprayed with fluorescein and exposed to bromine vapors. There became visible three separate bands representing the three components of the original mixture.

*Example IV*

A column was prepared as in Example I with the exception that 0.075% zinc cadmium sulphide and 0.075% zinc silicate were incorporated with the adsorbent. A solution of 100 mg. of crude isoeugenol in 1 ml. ethyl acetate was applied to the end of the column. The column was developed with 15% ethyl acetate in hexane. The column was then observed under ultra-violet light and it was noted that 5 bands were present, a major band of isoeugenol and 4 smaller bands representing four different impurities orginally present in the crude isoeugenol.

In preparing the rigid column, the desired adsorbent is first selected. This may be any one or a mixture of the usual finely ground solid materials used for such purposes as for example silica, alumina, silicic acid, magnesium oxide, magnesium hydroxide, aluminum hydroxide, bentonite, clays, diatomaceous earths, ion-exchange resin, and so forth. The adsorbent is then mixed with about 10–30% of its weight of plaster of Paris. The resulting mixture is then blended with enough water to make it liquid and the slurry is rapidly cast into the desired shape. If the final chromatograph is to be examined by ultra-violet light small percentages of zinc cadmium sulphide and zinc silicate may be incorporated in the column ingredients to make the bands visible in ultra-violet light. Usually we prefer to cast the column with a square cross section (about 1" square) whereby all four sides are available for application of different indicators. Thus in one experiment, impure citral was chromatographed on the rigid column and sprayed with fluorescein-bromine on one side and o-dianisidine on the other. By this means the position of the aldehyde with ethylenic bonds was determined and was thus differentiated from the other aldehydes present as impurities. Although we generally prefer a column about 1" square in cross section we have made columns with cross sections as large as 4" square. Such wide columns are especially valuable where it is desired to cut out the bands and isolate the material therefrom. For convenience in handling we usually prefer to embed a glass rod into the column as it is cast to provide a handle by which the column may be transferred from place to place without touching its surface. After the casting has hardened it is dried in an oven at elevated temperature and is then kept in a desiccator to prevent it from absorbing moisture from the air.

As set forth above, in using the column the material in question is applied to one end of the rigid column. Where a handle is provided the material is applied to the end opposite the handle. The column is then ready for development by positioning it in a vessel with the material deposit at the bottom of the column. A suitable solvent for the development is then applied uniformly to the bottom of the column and allowed to rise up through the column by capillary attraction. In order to ensure uniform flow, the solvent is preferably caused to initially flow through a mass of finely divided material which is in contact with the bottom of the column. After the development is complete, the column, if the bands are not visible, may be sprayed with the usual indicators to render the bands visible.

Having thus described our invention, we claim:

1. A method for resolving a mixture of compounds which comprises applying the mixture to the end of a rigid, self-supporting, self-contained column composed of a finely divided adsorbent material and gypsum, positioning the column so that the material deposit is at its lower end, which end is in contact with a mass of finely divided inert material and applying a solvent to said inert material whereby the solvent ascends through the column by capillary attraction at a uniform rate, the greatest part of the surface of said column being free from contact with any solid material.

2. A method for resolving a mixture of compounds which comprises providing a rigid, self-supporting, self-contained column composed of a finely divided adsorbent material and gypsum and having an elongated rod embedded therein and protruding beyond the end of said column to provide a handle therefor, depositing the mixture to the end of the column opposite the handle, hanging the column by said handle with its lower end, that having the material deposit, in contact with a mass of finely divided inert material, the greatest part of the surface of the column being free from contact with any solid material, and applying a solvent to said inert material whereby the solvent will ascend the column at a uniform rate thus to resolve the mixture by forming sharply defined bands of its components, these bands being of uniform composition throughout the cross section of the column.

3. An apparatus for resolving a mixture of compounds by chromatographic adsorption, comprising: a housing, a rigid, self-supporting, self-contained, elongated, removable column composed of a finely divided adsorbent material and gypsum, means for supporting the column in the housing with its sides in spaced relation to the side walls and to the bottom of the housing and also for feeding a solvent to the lower end of the column, whereby upon removing and inverting the column and applying a solution of the mixture of compounds to the lower end thereof, and repositioning the column in said housing, and feeding the said solvent to the lower end of the column, chromatographic development takes place, said self-contained column having exposed sides whereby if desired, a suitable indicator can be applied after development to cause formation of color bands, and successive indicator applications may be made by first scraping off the previous application from the surface of the rigid column.

4. The apparatus of claim 3 in which the removable rigid column is cast about a partly embedded rod which serves as means for lifting the column from the apparatus and as means for strengthening the column.

5. The apparatus of claim 3 in which the column is provided with a partly embedded rod which serves for reinforcement and as means for lifting it from the housing.

6. The apparatus of claim 3 in which the means for supporting the column and for feeding a solvent to the lower end of the column includes a ring in which the lower end of the column is sealed, the ring having an inlet for solvent below the lower end of the column.

References Cited in the file of this patent

UNITED STATES PATENTS

| | | |
|---|---|---|
| 195,618 | Levis | Sept. 25, 1877 |
| 1,211,028 | Zappi | Jan. 2, 1917 |
| 1,667,019 | Venzie | Apr. 24, 1928 |
| 1,858,369 | Linzall et al. | May 17, 1932 |
| 1,873,707 | Harsberger et al. | Aug. 23, 1932 |
| 1,993,955 | Benner et al. | Mar. 12, 1935 |
| 2,261,517 | Greger | Nov. 4, 1941 |
| 2,478,194 | Houdry | Aug. 9, 1949 |
| 2,543,286 | Hirschler | Feb. 27, 1951 |

FOREIGN PATENTS

| | | |
|---|---|---|
| 585,224 | Great Britain | Feb. 3, 1947 |

OTHER REFERENCES

Williams: Intro. to Chromatography, pp. 6 and 11, 1946.

Meinhard et al.: Chem. Abstr., vol. 43, March 25, 1949, p. 2114 (i), and vol. 44, September 25, 1950, p. 8279 (g).

Strain: Chromatographic Adsorption Analysis, pp. 50–52 and 59, 1945.